United States Patent [19]

Michel et al.

[11] Patent Number: 4,849,153

[45] Date of Patent: Jul. 18, 1989

[54] PROCESS FOR THE PRODUCTION OF A MOLDING FROM A PREFORM COMPOSED ESSENTIALLY OF POLYMERIZED UNITS OF TETRAFLUOROETHYLENE

[75] Inventors: Wolfgang Michel, Burgkirchen; Martin Neumeier, Kastl, both of Fed. Rep. of Germany

[73] Assignee: Hoechst Aktiengesellschaft, Frankfurt, Fed. Rep. of Germany

[21] Appl. No.: 166,047

[22] Filed: Mar. 9, 1988

[30] Foreign Application Priority Data

Mar. 11, 1987 [DE] Fed. Rep. of Germany ....... 3707730
Jul. 16, 1987 [DE] Fed. Rep. of Germany ....... 3723489

[51] Int. Cl.$^4$ ................ B29C 51/00; B29C 43/02
[52] U.S. Cl. ..................... 264/322; 264/523; 264/544; 264/570; 264/571; 264/292; 264/319; 264/320
[58] Field of Search ............... 264/127, 523, 529, 553, 264/547, 571, 291, 331.14, 544, 570, 500, 292, 319, 320, 322

[56] References Cited

U.S. PATENT DOCUMENTS

| | | | |
|---|---|---|---|
| 3,891,736 | 6/1975 | Voaden | 264/553 |
| 3,893,882 | 7/1975 | Repenning | 264/553 |
| 3,957,939 | 5/1976 | Voaden | 264/553 |
| 4,129,618 | 12/1978 | Downer et al. | 264/127 |
| 4,165,357 | 8/1979 | Vetter | 264/553 |
| 4,261,473 | 4/1981 | Yamada et al. | 264/544 |
| 4,510,300 | 4/1985 | Levy | 264/127 |

FOREIGN PATENT DOCUMENTS

| | | | |
|---|---|---|---|
| 1479625 | 12/1970 | Fed. Rep. of Germany. | |
| 232669 | 2/1986 | German Democratic Rep. | 264/553 |
| 56-213 | 4/1982 | Japan | 264/553 |
| 141529 | 6/1986 | Japan | 264/331.14 |

OTHER PUBLICATIONS

Abstract of East German 232,669.

*Primary Examiner*—Jan H. Silbaugh
*Assistant Examiner*—MaryLynn Fertig

[57] ABSTRACT

A process for the production of a molding from at least one preform, in which process the preform, which has been heated to 330° to 400° C., is pressed by means of a pressure difference which increases slowly during the shaping into or onto a rigid mold heated to about the same temperature, and is then cooled while the pressure difference is maintained and is released from the mold. During the shaping and cooling, the edges of the preform are secured in their original position. The process makes it possible to produce moldings which have a thin wall thickness and a good surface and which exhibit a residual shrinkage which is sufficiently small for most applications.

8 Claims, No Drawings

PROCESS FOR THE PRODUCTION OF A MOLDING FROM A PREFORM COMPOSED ESSENTIALLY OF POLYMERIZED UNITS OF TETRAFLUOROETHYLENE

DESCRIPTION

The invention relates to a process as claimed in patent claim 1.

It is known to produce a molding from a preform, for example a film composed essentially of a thoroughly thermoplastic polymer, by pressing the heated preform by means of a pressure difference into or onto a rigid mold, then cooling the product and separating it from the mold. This frequently used molding process has hitherto been used, for considerably modified, for preforms composed essentially of polymerized units of tetrafluoroethylene, since it has not been possible to process preforms of this type by the process developed for thermoplastic polymers.

Thus a process is known from German Auslegeschrift No. 1,479,625 in which a film composed of a fluorocarbon polymer is heated at 245° to 330° C. and, during shaping caused by the pressure applied vertically to the surface of the film, a pressure is applied at the same time to the edge of the film situated outside the aperture of the deep-drawing mold, which pressure effects a continued flow of the part of the film not yet deep-drawn towards the aperture of the deep-drawing mold, and the molding is subsequently cooled to a temperature below about 38° C. The agent used for the application of the pressure is preferably silicone oil (column 5, lines 29 to 33). After cooling to below 38° C., the finished molding is slowly reheated, while it is still in the mold, to a temperature which is at least 55° C. above the temperature of subsequent use, but is not appreciably above 330° C. (column 5, lines 16 to 22). Above 330° C. the polymer fluorocarbons, in particular polymers and copolymers of tetrafluoroethylene, are converted into an amorphous gel state in which, to a considerable extent, they do not flow and permit only limited shaping without the risk of fracture (column 1, lines 19 to 37).

This process evidently permits the production of moldings at a comparatively satisfactory deep-drawing ratio and having edges which exhibit a small edge radius, but it is expensive in terms of apparatus and requires a considerable time for the subsequent heat treatment.

Another process is known from DD 232,669-A1, in which a polytetrafluoroethylene film is heated to over 327° C. in a heated cabinet, is pressed in a device against the bottom edges of the female mold in a sealing manner, forced by means of compressed air into the female mold in a positive manner, cooled under conditions that ensure continued flow of the material and then removed with stable dimensions. During the molding process an air gap is formed through which the film continues to flow during cooling at the surface of the female mold and as the result of compressed air flowing over it. Nothing is stated about the deep-drawing ratio which can be achieved or the edge radius of the molding. According to the exapmle, a molding without sharp edges and having a low deep-drawing ratio is produced.

A process has now been formed which requires a comparatively low expenditure in terms of apparatus and which makes it possible to produce, from a preform containing predominantly polymerized tetrafluoroethylene units, moldings which require no subsequent heat treatment.

The new process for the production of a molding from at least one preform composed essentially of a polymer containing at least 98 % by weight, relative to the polymer, of polymerized units of tetrafluoroethylene, in which process the heated preform is pressed by means of a pressure difference into or onto a rigid, heated mold and is then cooled and separated from the mold, comprises heating the rigid mold and the preform to 330° to 400° C. and, when a temperature within this range has been reached, applying a pressure difference which increases slowly during the shaping, the edges of the preform being firmly held in their original position during shaping and cooling.

The new process is sutiable for shaping preforms of various kinds, such as, for example, cylindrical hollow bodies closed at one end, or film or sheeting offcuts having a wall thickness of about 20 to about 6,000 μm. It is preferable to use a preform which has a wall thickness of 500 to 3,000 μm for the new process. It is preferable to use at least one film or sheeting offcut as the preform.

The process is advantageously carried out using a preform composed essentially of a polymer containing up to 98 % by weight, relative to the polymer, of polymerized units of tetrafluoroethylene. It is preferable to use a preform composed of a polymer composed of 99 % by weight, in particular 99.5 % by weight, relative to the polymer, of polymerized units of tetrafluoroethylene. The remaining polymerized units present in the polymer can be composed of one or more fluorinated monomers which are copolymerizable with tetrafluoroethylene. In addition to polymerized units of tetrafluoroethylene, the polymer of which the preform is essentially composed advantageously contains 0.003 to 0.5 mol %, relative to the polymer, of polymerized units of at least one monomer of the formula $A-CF=CF_2$ in which A denotes: trifluoroethyl, a perfluoroalkoxy radical having 1 to 6 carbon atoms or a radical of the following formula:

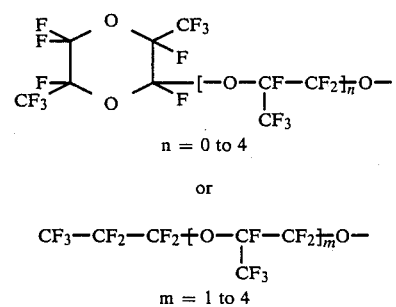

$n = 0$ to $4$ or $$CF_3-CF_2-CF_2+O-CF-CF_2\}_m O-$$
$$\qquad\qquad\qquad\qquad\quad|$$
$$\qquad\qquad\qquad\qquad\ CF_3$$

$m = 1$ to $4$

In a further preferred embodiment of the process according to the invention the preform is composed essentially of pure polytetrafluoroethylene.

In addition to the polymer component, the preform can also contain up to 30 % by weight, preferably up to 20 % by weight, of finely divided fillers, such as glass, carbon, graphite, bronze, stainless steel, ceramics and colored pigments and fluorescent agents.

The preform can be produced by processes known per se, for example at an elevated temperature by mechanical or isostatic compression, by ram-extrusion of a tube offcut which is heat-sealed at one end, or, if the preform is a film offcut, by slicing a sintered block and cutting to appropriate size.

The rigid mold and the preform are heated to 330° to 400° C. If the temperature of the preform is below 330° C. or above 400° C., difficulties caused by crack growth are observed to an increasing extent, as a result of which only low shaping ratios are achieved, if at all. The preform should preferably have a temperature of 340° to 360° C. at the start of the shaping.

The temperature of the mold surface with which the preform comes into contact can differ somewhat from the temperature of the preform, but it should be above the crystallite melting point of the preform and below about 420° C. at the start of the shaping process. If the temperature of the mold surface is too high, pit formation takes place during the shaping process, while if this temperature is below the crystallite melting point, microporosity and color variations are observed in the molding produced. The temperature difference between the mold surface and the preform at the start of the shaping process should advantageously be not more than ±15° C., in particular not more than +7° C.

When the preform has reached its highest temperature, i.e. the desired processing temperature, a pressure difference which increases slowly during the shaping and by means of which the heated preform is pressed into or onto the rigid, heated mold is applied. The increase in this pressure difference during the shaping process should not be more than 33 kPa/s, since if the increase in the pressure difference is greater, the preform generally cracks. It is preferable to apply an increase in the pressure difference of 10 to 1.5 kPa/s, in particular an increase in the pressure difference of 6 to 3 kPa/s. The pressure difference is given by the pressure on the surface of the preform turned away from the mold surface, minus the pressure on the surface of the preform facing the mold surface.

The pressure difference can be increased continuously or in stages during the shaping process. In either case, the time from the start of the application of a pressure difference until contact between the surface of the heated preform and the mold surface is virtually complete should not exceed 180 seconds. A longer time is, as a rule, not necessary; it would only render the process less commercially efficient and would entail other disadvantages.

When the surface of the preform is in virtually complete contact with the surface of the mold, the molding and the mold are cooled to at least 260° C. while the pressure difference is maintained; the molding formed from the preform can then be released from the mold and cooled further on its own, while the mold surface which has been in contact with the molding can be reheated, for a new molding process, to a temperature above the crystallite melting point of the preform to be shaped. In principle, the molding can also be released from the mold at a temperature below 260° C., but the use of a lower demolding temperature is generally not necessary. The cooling to 260° C. or to a lower temperature can be carried out rapidly or slowly, depending on the properties in use desired for the molding.

During the shaping and cooling, the edges of the preform are secured in their original position, this can be achieved, for example, if the preform is a film or sheeting offcut, by means of a frame, by means of which the film or sheeting, respectively, is pressed onto the edges of the mold by means of locking screws, toggle levers or springs. The edges of a cylindrical preform, closed at one end, are secured, for example, by partial faces of a divided mold, such as flanges, or by the mold and the closing unit having conical surface elements which match one another.

The surface of the mold which shapes the preform can have a hollow or convex shape. If a convex mold is used, it must be borne in mind in its design that the molding produced from the preform will shrink during cooling as a consequence of natural negative thermal expansion. It is preferable for the side walls of the shaping surfaces to be uniformly continuous and to taper slightly in the form of a cone in the direction of molding.

The pressure difference can be generated either with gases or with liquids; it is preferably produced by means of a gas, especially air. In this respect the pressure on the sides of the preform facing the shaping surface can, for example, be reduced by slow, stagewise or continuous evacuation of the space between the preform and the shaping surface, or the pressure is increased slowly, continuously or in stages, on the side of the preform turned away from the shaping surface, it being possible for the air enclosed between the preform and the shaping surface to escape through apertures in the mold during the shaping process. The pressure difference which is at least required for complete shaping depends on the thickness of the preform, its composition and the temperature applied; as a rule it is below 100 kPa. It is therefore indeed possible, but not necessary, to apply a final pressure difference greater than 100 kPa.

The heating of the preform and the surface of a mold which comes into contact with the preform can be effected in various ways. It is preferable, for example, to heat the preform and the mold in the same area, for example by means of hot air. Separate heating of the preform is, however, also possible, for example by means of radiant heaters or hot air, if the preform is a film, and separate heating of the mold is also possible, for example by means of a heated liquid or electrical heating.

If the preform is a film, the process according to the invention can be combined with preliminary shaping of this film, for example by means of a punch heated to about the temperature of the film, or by means of a constant pressure difference which is not sufficient for the complete shaping of the film. The new process can also be carried out with two or more superimposed films or two or more cylindrical hollow bodies, closed on one side and fitting into one another, the composition of the films or hollow bodies being advantageously selected in such a way that they can be heat-sealed to one another during the course of the process without interference caused by thermal damage. At least one of these films or hollow bodies should have the composition indicated earlier in the text, which is advantageous for the new process. A second one of these films or hollow bodies may consist of a metal or an alloy which is able to be vacuum-formed at 330° to 400° C., for example aluminum or an alloy of aluminum. An adhesion improving intermediate-film or -layer may be placed between the metal film and the film being composed essentially of a polymer containing at least 98 % by weight, relative to the polymer, of polymerised units of tetrafluoroethylene, as mentioned above.

The process according to the invention makes it possible to produce moldings of a low thickness in a comparatively short time, with a residual shrinkage adequate for most fields of application and with a smooth surface. An aftertreatment of the surface of the molding, such as is customary in the case of moldings produced by compression, is unnecessary, and a subsequent heat treatment is also not required. The process is not very expensive in terms of apparatus and can be carried out with equipment normally available on the market, rebuilt at reasonable costs.

The following examples are intended to illustrate the invention in greater detail:

EXAMPLE 1

A hollow metal mold having a cavity in the form of a rectangular parallelepiped of length 165 mm, width 165 mm and depth 125 mm is used. The outer edges of this cavity are level and smoothed and a square metal frame of internal aperture 165×165 mm can be fastened on them by means of wing nuts and compression springs. Apertures leading into a central line are fitted on the edges between the base and the side walls of the cavity. This line is connected to a pressure gauge and, via a valve, to a vacuum pump.

The sheet intended for shaping is 2,500 μm thick and contains 0.044 mol %, relative to the polymer content of the sheet, of polymerized units of perfluoropropyl perfluorovinyl ether; the remainder are polymerized units of tetrafluoroethylene. The sheet is composed solely of the polymer.

The hollow mold is first heated to 350° C. in an oven, and a piece of the sheeting described, cut to an appropriate size, is then fitted, by means of the metal frame, over the aperture of the cavity and fitting tightly to its outer edges. The hollow mold equipped with the sheet is then heated in the oven again until both the sheet and the hollow mold are a temperature of 360° C. which is constant for a few minutes. The valve to the vacuum pump is then opened slowly, so that the pressure difference between the two sides of the sheet increase at a rate of 3.5 kPa/s up to a final pressure difference of 95 kPa. The hollow mold containing the molding is then removed from the oven, while the pressure difference is maintained, and is cooled to 120° C. with compressed air, the wing nuts are opened and the molding is removed from the mold. It has been faultlessly shaped and its edge radius is 6 mm. When cooled to 22° C., the molding undergoes no further change.

EXAMPLE 2

A hollow metal mold having a cylindrical cavity of diameter 100 mm and depth 50 mm is used. The outer edges of this cavity are level and smoothed and an annular frame with a clear internal diameter of 100 mm can be fastened on them by means of wing nuts and compression springs. Apertures leading into a central line are fitted, in a uniform distribution, on the circular edge between the cylinder wall and the base of the cavity. This line is connected to a pressure gauge and, via a valve, to a vacuum pump.

The sheet intended for shaping is 1,000 μm thick and is composed solely of polytetrafluoroethylene.

The procedure is as described in Example 1, but the increase in the pressure difference is set at 4.6 kPa/s. When the final pressure difference of 92 kPa has been reached, the hollow mold containing the molding is removed from the oven, while the pressure difference is maintained, and is cooled to 200° C. with compressed air, the wing nuts are opened and the molding is removed from the hollow mold. It has been faultlessly shaped and its edge radius is 4 mm. When cooled to 22° C., the molding undergoes no further change. The molding is then heated at 260° C. for one hour, in the course of which it exhibits a shrinkage (contraction) of 1.77 %.

EXAMPLE 3

The procedure is analogous to that of Example 2, using the same hollow mold and the same experimental conditions, with the following exceptions:

The sheet intended for shaping contains 0.044 mol %, relative to the polymer component of the sheet, of polymerized units of perfluoropropyl perfluorovinyl ether, the remainder being polymerized units of tetrafluoroethylene. The sheet consists solely of the polymer and, as in Example 2, has a thickness of 1,000 μm.

The hollow mold equipped with the sheet is heated in the oven in three different tests carried out successively to 330, 340 and 360° C., being cooled each time to 200° C. while the pressure difference is maintained, and the molding is then removed from the hollow mold.

All three moldings produced at different temperatures have been well shaped and have an edge radius of 4 mm. Compared with the moldings produced at 340 and 360° C., however, the molding produced at 330° C. is less stable because of an evidently greater variation in the distribution of wall thickness.

COMPARISON TEST

The procedure is as described in Example 3, but the hollow mold is first heated in the oven to 280° C. and the sheet is then put on and the hollow mold together with the sheet is heated in the oven until the mold and the sheet are at a temperature of 290° C. which is constant for a few minutes. A pressure difference of 92 kPa is then produced by opening the valve to the vacuum pump. This causes only a slight change in the shape of the sheet; virtually no shaping takes place.

EXAMPLE 4

A hollow metal mold composed of two half-shells with flanges which can be pressed against one another so as to form a tight closure is used. The cavity in the interior of the mold has the shape of a substantially cylindrical bottle with a neck flared towards the outside. A metal punch having in its center a bore hole connected to a compressed air line with a regulating valve fits into the conical neck faces. The internal diameters of the hollow mold are diameter 68 mm and height (including the neck of the bottle) 110 mm. The smallest diameter of the bottle neck is 38 mm. At the outer edge of the base of the bottle the mold has a plurality of perforations of small diameter at uniform distances in order to enable the enclosed air to escape during the shaping process.

A preform having the shape of a hollow cylinder closed at one end, having a wall thickness of 2,000 μm and a length of 110 mm is produced on a lathe from a whole cylinder of diameter 38 mm composed of a sintered polymer which, in addition to polymerized units of tetrafluoroethylene, contains 0.044 mol %, relative to the polymer, of polymerized units of perfluoropropyl perfluorovinyl ether. This preform is put into the hollow metal mold and is clamped with its open end in the neck forming a tight closure with the conical faces of the perforated metal punch. The mold and the preform are then heated for 1 hour in a sintering oven at 360° C. (the temperature of the interior of the oven) and shaping is then carried out by means of compressed air at a rate of 5 kPa/s up to a final pressure difference of 200 kPa. The hollow mold containing the molding is then removed from the oven while the pressure difference is maintained and is cooled with water at 18° C. for 10 minutes, and the molding is removed from the mold. A faultlessly shaped bottle having a uniform wall thickness of 1,000 μm ±50 μm, the wall thickness at the neck averaging 1,500 μm and decreasing towards the body of the bottle, and which has a handsome, completely smooth surface, is obtained. This bottle is heated at 270° C. for 1 hour and exhibits a shrinkage of 2.25 % in the course of this.

We claim:

1. A process for the production of a molding having low residual shrinkage and a smooth surface from at least one preform, said preform consisting essentially of a polymer containing at least 98% by weight, relative to the polymer, of polymerized units of tetrafluoroethylene, in which process the preform is pressed into or onto a rigid mold and is then cooled and separated from the mold, said process comprising:

heating the rigid mold and the preform to 330 to 400° C., and, when a temperature within this range has been reached, shaping the preform by firmly holding the edges of the preform in their original position during the shaping and the subsequent cooling and by applying a pressure difference to the preform and increasing the pressure difference so that the pressure difference at the conclusion of the shaping step is greater than at the beginning of the shaping step, but the rate of increase in the pressure difference does not exceed 33 kPa/s during the shaping step, said pressure difference being determined by the pressure on the surface of the preform turned away from the mold surface, minus the pressure on the surface of the preform facing the mold surface.

2. The process as claimed in claim 1, wherein the increase in the pressure difference during the shaping of the preform is 10 to 1.5 kPa/s.

3. The process as claimed in claim 1, wherein the temperature of the preform at the start of shaping is 340° to 360° C.

4. The process as claimed in claim 1, wherein the surface of the mold has at least the same temperature as the crystallite melting point of the preform, and the temperature difference between the mold surface and the preform at the start of the shaping step is not more than ±15° C.

5. The process as claimed in claim 1, wherein the preform has a wall thickness of 500 to 3,000 μm before being shaped.

6. The process as claimed in claim 1, wherein the preform consists essentially of polytetrafluoroethylene.

7. The process as claimed in claim 1, wherein the preform consists essentially of a polymer which, in addition to polymerized units of tetrafluoroethylene, contains 0.003 to 0.5 mol %, relative to the polymer, of polymerized units of at least one monomer of the formula A—CF=CF$_2$ in which A denotes: trifluoromethyl, a perfluoroalkoxy radical having 1 to 6 carbon atoms or a radical having the following formula:

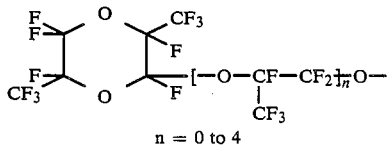

n = 0 to 4 or

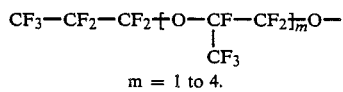

m = 1 to 4.

8. The process as claimed in claim 1, wherein the time elapsed from the start of the application of the pressure difference to the completion of the shaping step does not exceed 180 seconds.

* * * * *